United States Patent [19]

Yamashita et al.

[11] Patent Number: 5,161,813
[45] Date of Patent: Nov. 10, 1992

[54] VEHICLE STEERING APPARATUS AND A VEHICLE PROVIDED WITH THE SAME

[75] Inventors: Mitugu Yamashita; Mutsumi Kawamoto, both of Tokyo; Hidemitsu Inagaki, Nishio, all of Japan

[73] Assignee: Aisin AW Co., Ltd., Japan

[21] Appl. No.: 690,836

[22] Filed: Apr. 24, 1991

[51] Int. Cl.$^5$ .............................................. B62D 3/00
[52] U.S. Cl. .................................... 280/96; 280/96.1; 180/151; 180/253
[58] Field of Search ...................... 180/151, 65.5, 253; 280/95.1, 96, 846, 96.1, 673

[56] References Cited

U.S. PATENT DOCUMENTS

| | | | |
|---|---|---|---|
| 1,577,559 | 3/1926 | Budd | 280/96 |
| 3,186,506 | 6/1965 | Leach et al. | 180/253 |
| 4,013,301 | 3/1977 | Gaskin | 280/95.1 |
| 4,798,260 | 1/1989 | Nakata et al. | 180/253 |
| 4,972,914 | 11/1990 | Asanuma | 280/95.1 |

FOREIGN PATENT DOCUMENTS 939079  10/1963  United Kingdom ................ 180/253

*Primary Examiner*—H. Grant Skaggs
*Attorney, Agent, or Firm*—Lorusso & Loud

[57] ABSTRACT

A vehicle steering apparatus includes a steering mechanism adapted to transmit a steering angle of a steering wheel through a link mechanism to a wheel. The vehicle steering apparatus includes an angle increasing gear set disposed between the link mechanism and the wheel for increasing the steering angle of the steering wheel to be transmitted to the wheel. The angle increasing gear set and the wheels are supported by a vehicle frame through a suspension. The angle increasing gear is formed of an internal gear wheel connected to the link mechanism and an external gear wheel connected to the wheel and meshing with the internal gear wheel.

6 Claims, 3 Drawing Sheets

VEHICLE STEERING APPARATUS AND A VEHICLE PROVIDED WITH THE SAME

BACKGROUND OF THE INVENTION

1. Field of the Invention

The present invention relates to a vehicle steering apparatus capable of a smooth and small turn at a large steering angle and a parallel movement in a substantially lateral direction, and to a vehicle provided with the same.

2. Description of the Prior Art

In general, four wheels are required to have a turning center for a smooth turn of a four-wheeled vehicle. For this purpose, conventional steering mechanisms have employed steering link mechanisms provided with, for instance, knuckle arms and tie rods.

In this steering link mechanism, as shown in FIG. 3, tie rods 01 are rotatably connected at tie rod ends 01a to ends of knuckle arms 02. The opposite ends of knuckle arms 02 are connected to king pins 03 of right and left wheels, respectively. Each tie rod 01 in this steering mechanism is adapted to be moved laterally or in right and left directions by a steering torque applied from a steering wheel through, for instance, a rack-and-pinion gear, a worm gear or a hydraulic cylinder so as to turn the knuckle arm 02. In this manner, the right and left wheels are laterally steered.

In many conventional automobiles, as shown in FIG. 4, each front wheel 04 is supported by a suspension 05 of a strut type. In this arrangement, a king pin offset is formed between the front wheel 04 and the suspension 05, and the steering force required on the steering wheel depends on the amount of this king pin offset. Thus, a larger amount of the king pin offset causes a larger steering force required on the steering wheel.

However, in such steering mechanism, the tie rod 01 and the knuckle arm 02 may be rectilinearly aligned with each other, as shown in FIG. 3, in which case further steering operation for the wheels can not be carried out. This condition is a limit of an allowable wheel steering operation and the limit for steering angle $\alpha$ is generally of about 45 degrees. The limit in the wheel steering will restrict the steering operation for the small turn.

Futher, if the apparatus were designed to set the steering angle $\alpha$ of the wheels to a value exceeding the limit, e.g., 90 degrees, a problem would be created in that the wheels could not be driven by driving power from a driving source provided on a vehicle body at the steering angle $\alpha$ of 90 degrees.

In view of the above, the applicant has already filed the Japanese Patent Application No. 63-165498 for a steering mechanism and a vehicle provided with the same, in which the above problems are eliminated.

In the steering mechanism and the vehicle provided with the same disclosed in this patent application, steering angle of the steering wheel is mechanically transmitted to the wheels through a link mechanism in such a manner that the steering angle is increased by a multiplying gear set provided on the vehicle frame, and driving motors are individually associated with the respective wheels.

Usage of the multiplying gear set for each wheel enables steering over 90 degrees as well as rotational driving by the driving motors at the steering angle of 90 degrees.

The steering mechanism thus employing the multiplying gear set may be used for each of the front and rear wheels, in which case the front wheels as well as the rear wheels may be steered at 90 degrees, which enables a small turn and a parallel movement in a lateral direction.

This steering mechanism, however, is adapted to transmit the steering force, which is increased by the multiplying gear sets on the vehicle body, through the torque link to each wheel to be steered. Therefore, rattling may be caused at three points in the torque link, which may cause an unstable steering operation of the wheel. Further, since the velocity increasing gear is formed of a pair of external gear wheels, the knuckle arm may interfere with a wheel or a tire if a sufficient distance is not left therebetween.

On the other hand, a conventional suspension structure shown in FIG. 4 is provided with a knuckle arm 06 of the steering mechanism, which is formed integrally with the strut 05a. In this structure, since an angle $\beta$ and the position of the king pin axis are determined by upper and lower supporting points of the knuckle arm 06, the amount of the king pin offset can not be sufficiently reduced. Therefore, there is created a problem in that the steering force required on the steering wheel is relatively large.

Accordingly, it is an object of the invention to provide a vehicle steering apparatus, overcoming the above-noted problems, in which the rattling in the steering link mechanism and the resulting unstable steering movement of the wheels can be prevented, and thus the running stability can be improved.

It is another object of the invention to provide a vehicle steering device in which steering force can be reduced.

It is still another object of the invention to provide a vehicle in which a small turn and a parallel movement can be smoothly and surely achieved even at a large steering angle.

SUMMARY OF THE INVENTION

Accordingly, a vehicle steering apparatus of the invention includes with reference to FIGS. 1 and 2, a steering mechanism is adapted to transmit a steering angle of a steering wheel (21) through a link mechanism (13, 14, 15, 16, 17, 18 and 20) to a wheel, a multiplying gear set (25) disposed between said link mechanism (13, 14, 15, 16, 17, 18 and 20) and the wheel (32 or 33) for increasing the steering angle of the steering wheel (21) to be transmitted to the wheel (32 or 33). The gear set (25) and wheel (32 or 33) are supported by a vehicle frame (1) through a suspension (2).

The multiplying gear set (25) is formed of an internal gear wheel (10) connected to the link mechanism (13, 14, 15, 16, 17, 18 and 20) and an external gear wheel (22) connected to the wheel (32 or 33) and meshing with the internal gear wheel (10).

Further, the invention provides a vehicle to which a vehicle steering apparatus is applied, the vehicle including the aforementioned steering mechanism and driving means (27, 28 and 29) individually attached to each wheel (32 or 33).

Because the apparatus angle increasing gear set (25) disposed between the link mechanism (13, 14, 15, 16, 17, 18 and 20) in the steering mechanism and the wheel (32 or 33) for increasing the steering angle of the steering wheel (21) to be transmitted to the wheel (32 or 33), and because the angle increasing gear set (25) and wheel (32 or 33) are supported by the vehicle frame (1) through the suspension (2), the torque link described in the previously mentioned patent application is not required. Therefore, there in no rattling as caused by such a torque link, and thus the instability of the wheels (32 and 33) is prevented, resulting in good running stability.

Further, since the torque link is not required, the king pin axis (b) which is a steering axis for the wheel (32 or 33) can be freely set. Therefore, an amount of a king pin offset can be reduced, and thus a steering force required on the steering wheel can be reduced. Further, the reduction of the amount of the king pin offset enables the rotation of the tires without receiving excessive loads, and thus the wear of the tires can be reduced.

Because the angle increasing gear set (25) is formed of the internal gear wheel (10) connected to link mechanism (13, 14, 15, 16, 17, 18 and 20) and the external gear wheel (22) connected to wheel (32 or 33) and meshing with said internal gear wheel (10), the angle increasing gear set (25) can be advantageously compact. Therefore, the angle increasing gear set (25) can be disposed in a small space between the suspension (2) and the wheel (32 or 33) with large degree of freedom. Further, owing to the employment of the internal gear wheel (10), the steering direction of the wheels (32 and 33) can be same as the turning direction of the link mechanism (13, 14, 15, 16, 17, 18 and 20). This can reliably prevent the interference of the wheel (32 or 33) with the link mechanism (13, 14, 15, 16, 17, 18 and 20).

Further, in a vehicle equipped with the velocity increasing gear (25) disposed between link mechanism (13, 14, 15, 16, 17, 18 and 20) and the wheel (32 or 33) for increasing the angle of the steering wheel (21) to be transmitted to the wheel (32 or 33), the angle increasing gear set (25) and wheel (32 or 33) being supported by the vehicle frame (1) through the suspension (2), with driving means (27, 28 and 29) individually attached to each wheel (32 or 33), the steering angle of the wheel can be set at a remarkably large value, and further the vehicle can smoothly and surely make a small turn with parallel wheel movement even at such large steering angle.

It should be noted that reference numbers are allotted to the above described structures and components only for reference to the drawings, and are not intended to restrict the invention in any sense.

These and other objects and features of the invention will become more apparent from the following description of preferred embodiments with reference to the accompanying drawings.

DETAILED DESCRIPTION OF THE PREFERRED EMBODIMENTS

Figure 1:
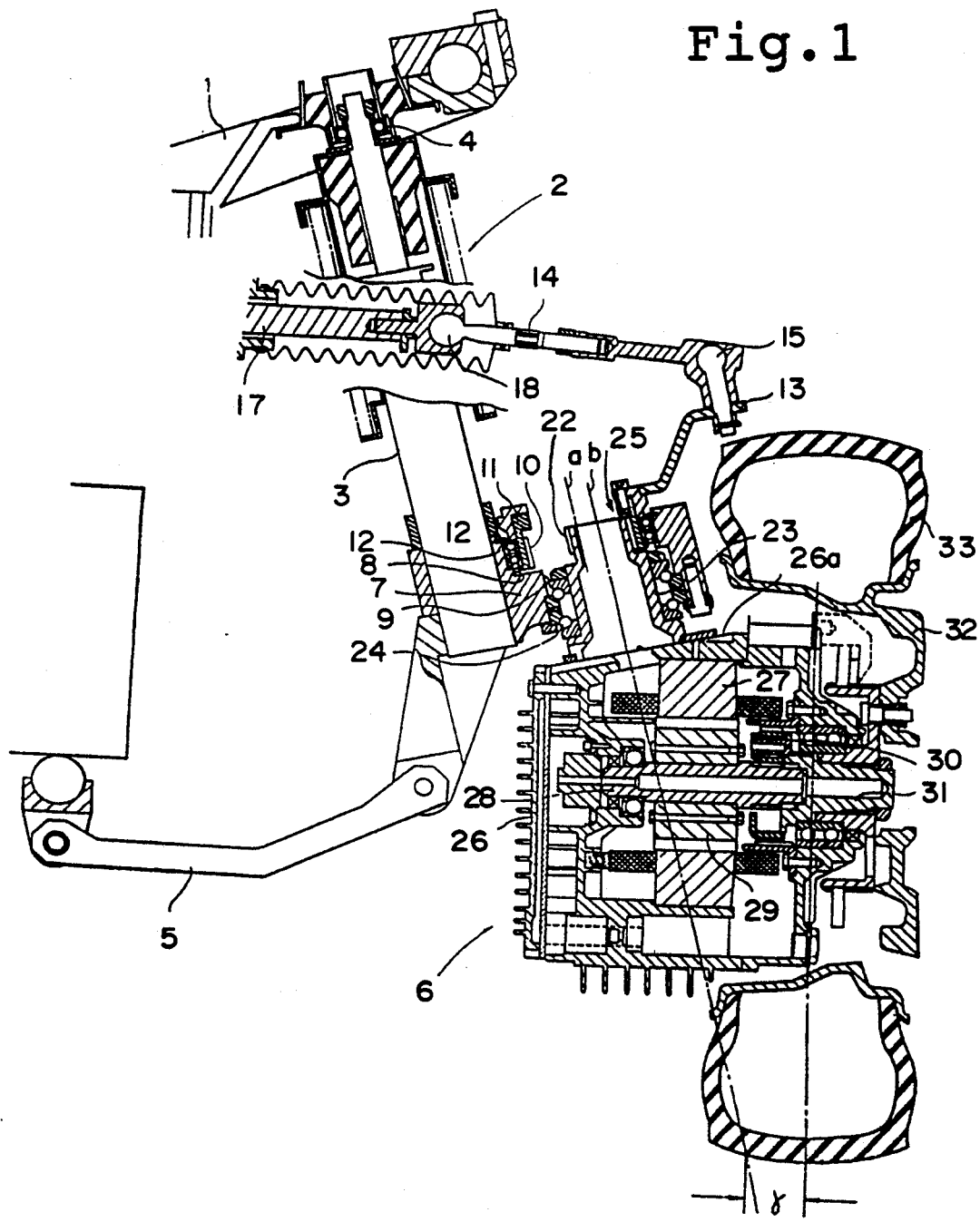
FIG. 1 is a cross section showing an embodiment of a steering mechanism used in a vehicle steering apparatus of the invention.

Referring to FIG. 1, a vehicle frame 1 supports an upper end of a strut 3 of a strut type suspension 2 through a bearing 4. A lower end of a strut 3 is pivotably supported on the vehicle frame 1 through a lower arm 5. The strut 3 is provided at its lower end with a support 7 for supporting a wheel motor 6. The support 7 is provided with a pair of upper and lower apertures 8 and 9 which are off center from each other, on centerlines a and lo, respectively substantially parallel to the strut 3. A first cylindrical member 11 having internal teeth 10 is supported in the upper aperture 8 through a bearing 12 for rotation about center axis a of the upper aperture 8.

A knuckle arm 13 is connected to an upper end of the first cylindrical member 11, and a tie rod 14 is connected to the knuckle arm 13 through a universal joint 15. As clearly shown in FIG. 2, the tie rod 14 is connected through a universal joint 18 to a relay rod 17 which is provided at a predetermined position with a rack 16. The rack 16 on the relay rod 17 meshes with a pinion gear 20 arranged at an end of a steering shaft 19, which is connected at its other end to a steering wheel 21. A link mechanism in the steering mechanism is formed of the knuckle arm 13, tie rod 14, universal joint 15, rack 16, relay rod 17, universal joint 18 and pinion gear 20.

The lower aperture 9 in the support 7 receives and supports a second cylindrical member 23 provided at its upper end with external teeth 22 through a double angular thrust ball bearing 24 for rotation about a center axis b of the lower aperture 9. The external teeth 22 of the second cylindrical member 23 mesh with the internal teeth 10 on the first cylindrical member 11. These internal teeth 10 and external teeth 22 form an angle increasing gear set 25. Thus, the angle increasing gear set 25 is arranged at the lower end of the strut 3. The double angular thrust ball bearing 24 is adapted to bear a thrust applied to the second cylindrical member 23.

A motor casing 26 of the wheel motor 6 is attached to a lower end of the second cylindrical member 23, In this arrangement, a mounting surface 26a of the motor casing 26 for the second cylindrical member 23 is formed by an inclined surface perpendicular to the center axis b of the cylindrical body. The motor casing 26 houses a stator 27 fixed thereto, a rotor 29 fixed to a motor rotary shaft 28, a planetary reduction gear 30 and others. The stator 27, motor rotary shaft 28 and rotor 29 form a driving motor for the wheel.

An end of the motor rotary shaft 28 is fitted to an end of a coaxial output shaft 31. The planetary reduction gear 30 is arranged on receiving portions of the shafts 28 and 31 so as to transmit power from the motor rotary shaft 28 through the planetary reduction gear 30 to the output shaft 31 after reducing the speed. The other end of the output shaft 31 is fixed to a wheel assembly including a wheel 32 and a tire 33. In this manner, the wheel motor 6 is constructed to combine structures of a driving motor and a wheel assembly. This wheel motor 6 can rotate and drive the wheel even when the wheel is steered at the angle of 90 degrees by the steering mechanism.

Figure 2:
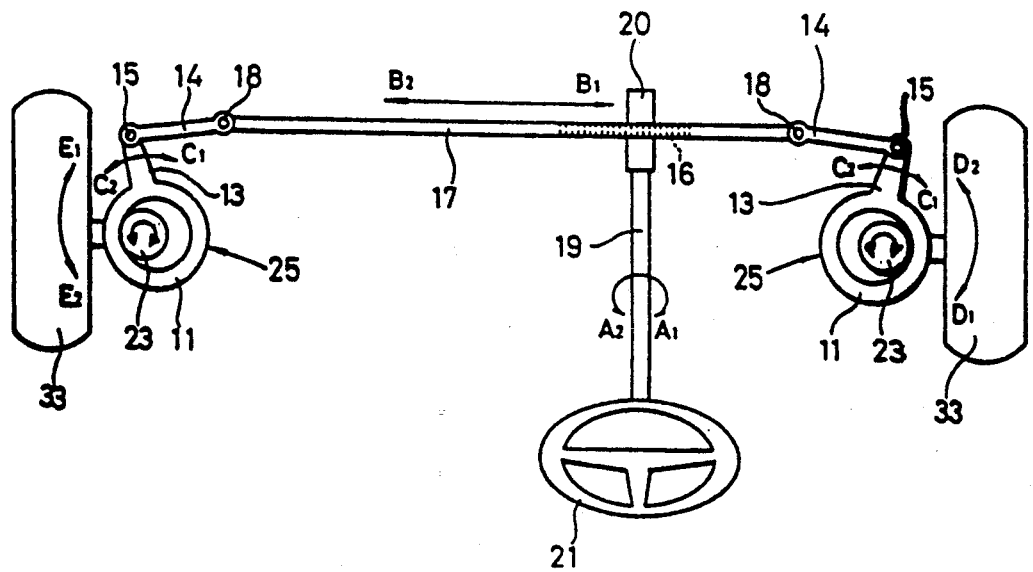
FIG. 2 is a schematic view of the steering mechanism of FIG. 1.
Figure 3:
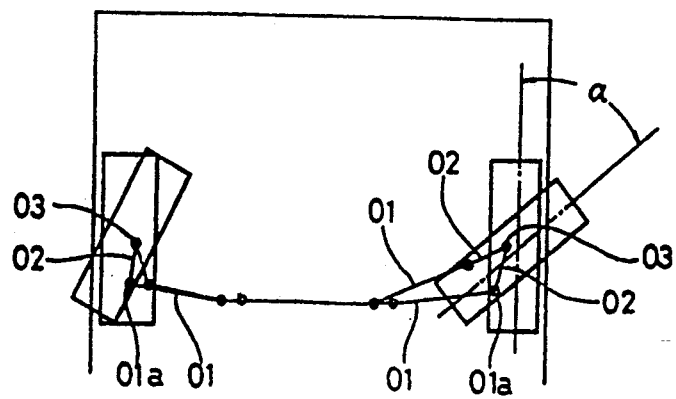
FIG. 3 is a schematic view illustrating a conventional steering mechanism.
Figure 4:
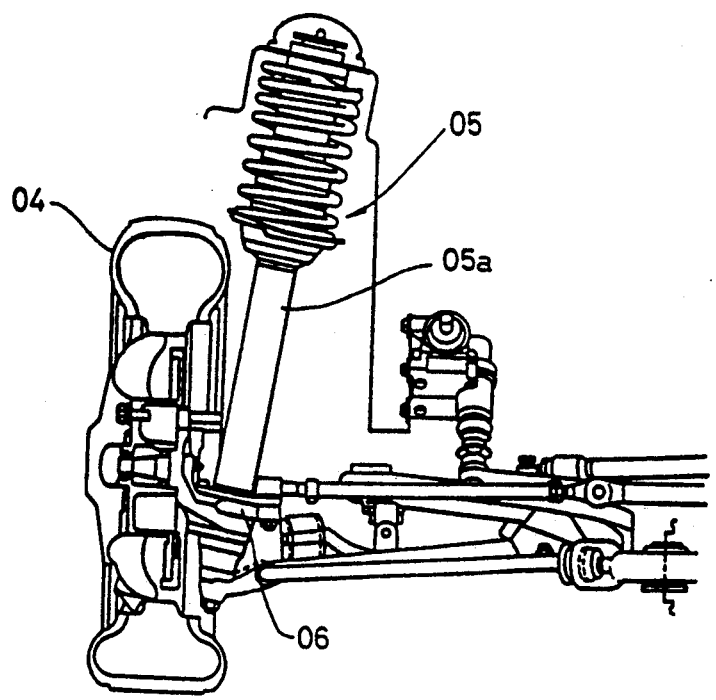
FIG. 4 is a view illustrating a conventional suspension.

As shown in FIG. 2, the right and left wheels are associated to same structures which are laterally symmetrical and include, respectively, the wheel motors 6, velocity increasing gears 25, suspensions 2 and link mechanisms. In these structures, the right and left tie rods 14 are connected together by the one relay rod 17.

An operation of the invention is as follows.

When the steering wheel 21 is turned right or clockwise to steer the right and left wheels in the right direction, it moves the relay rod 17 in the right direction $B_1$ through the pinion gear 20 and the rack 16. The relay rod 17 thus moved turns the right and left knuckle arms 13 in the right direction $C_1$ through the right and left tie rods 14. Each knuckle arm 13 thus turned causes the first and second cylindrical members 11 and 23 at the right and left sides to turn in the same right direction. In this operation, each angle increasing gear 25 multiplies the angle through which the second cylindrical member 23 turns relative to that of the first cylindrical member 11. The second cylindrical members 23 thus turned steers the right and left tires 33 in the right direction $D_1$ and $E_1$, respectively. For the steering operation of the wheels in the left direction, the steering wheel 21 is turned reversely, i.e., in the left direction, so that the relay rod 17 moves in the left direction $B_2$, and each knuckle arm 13 turns in the left direction $C_2$, whereby the right and left tires 33 are steered in the left direction $D_2$ and $E_2$, respectively.

In the steering mechanism thus constructed, since the angle increasing gear set 25 is disposed at the lower end of the strut 3, a torque link, which is a part of for the steering mechanism described in the previously mentioned patent application, is not required. Therefore, there in no rattling as caused by the torque link, and thus the instability or unstable movement of the wheels is prevented, and good running stability is achieved.

Further, since the torque link is not required, the king pin axis (the center axis b of the second cylindrical member 23) which is the steering axis for the wheel can be freely set. Therefore, the amount $\gamma$ of king pin offset can be reduced, and the steering force required on the steering wheel can be reduced. Further, the reduction of the amount of the king pin offset enables the rotation of the tires without receiving excessive loads, and thus the wear of the tires can be reduced.

Since the angle increasing gear set 25 is formed of the internal gear wheel 10 connected to the link mechanism and the external gear wheel 22 connected to the wheel and meshing with the internal gear wheel 10, the angle increasing gear set 25 can be compact. Therefore, the gear set 25 can be disposed in a small space between the suspension and the wheel 32 or 33 with large degree of freedom. Further, owing to the employment of the internal gear wheel 10, the steering direction of the wheels 32 and 33 can be same as the turning direction of the link mechanism, which can reliably prevent the interference of the wheel with the link mechanism.

Further, since the driving motors 27, 28 and 29 are individually attached to respective wheels 32 and 33, the vehicle can smoothly and surely make turn with a small radius and parallel movement even if the steering angle of the wheels is set at a remarkably large value.

Although particular preferred embodiments of the invention have been disclosed in detail for illustrative purposes it will be recognized that other variations or modifications may be made without departing from the spirit and scope of the invention as claimed.

What is claimed is:

1. A vehicle steering apparatus for transmitting rotation through a steering angle determined by the turning of a steering wheel, through a link mechanism, to the rotation of at least one wheel through a turning angle, said steering apparatus comprising:
   a gear set for multiplying said steering angle so that the turning angle through which the wheel turns is larger than said steering angle, said gear set comprising:
   a circular gear linked to the steering wheel for turning through said steering angle, said circular gear defining an internal cylindrical surface and having gear teeth disposed on said internal cylindrical surface; and
   a wheel gear turning said wheel through said turning angle, said wheel gear having external teeth and being mounted within said circular gear with said external teeth intermeshed with said internal teeth of said circular gear, said wheel gear having a diameter substantially smaller than the diameter of said interior cylindrical surface of said circular gear whereby the angle through which said wheel gear rotates is multiplied by a gear ratio in proportion to the ratio of the diameter of said circular gear to the diameter of said wheel gear.

2. The vehicle steering apparatus of claim 1 wherein said wheel gear is mounted within said circular gear through a double angular thrust ball-bearing.

3. The vehicle steering apparatus of claim 1 further comprising:
   a relay rod connected at one end to the steering wheel;
   a tie rod connected at the end of the said relay rod opposite said steering wheel through a first universal joint;
   a knuckle arm connected to the end of said tie rod opposite said first universal joint through a second universal joint, said knuckle arm being rigidly connected to said circular gear.

4. A vehicle steering apparatus for transmitting rotation through a steering angle determined by the turning of a steering wheel, through a link mechanism, to the rotation of at least one wheel through a turning angle, said one wheel being mounted on a supporting member for turning on a steering axis, said supporting member being attached to a vehicle frame through a suspension member, said steering apparatus comprising:
   a gear set for multiplying said steering angle so that the turning angle through which the wheel turns is larger than said steering angle, said gear set comprising:
   a circular gear rotatably mounted on said supporting member and linked to said steering wheel for turning through said steering angle, said circular gear defining an cylindrical surface and having gear teeth disposed on said cylindrical surface; and
   a wheel gear attached to said wheel for turning said wheel through said turning angle, said wheel gear having teeth meshed with said teeth of said circular gear, said wheel gear having a diameter substantially smaller than the diameter of said circular gear whereby the angle through which said wheel gear rotates is multiplied by a gear ratio in proportion to the ratio of the diameter of said circular gear to the diameter of said wheel gear.

5. The steering apparatus of claim 4 wherein said circular gear is an internal gear wheel and said wheel gear is an external gear wheel.

6. The steering apparatus of claim 4 wherein said suspension member is a strut.

* * * * *

UNITED STATES PATENT AND TRADEMARK OFFICE
CERTIFICATE OF CORRECTION

PATENT NO. : 5,161,813
DATED : November 10, 1992
INVENTOR(S) : YAMASHITA et al

It is certified that error appears in the above-identified patent and that said Letters Patent is hereby corrected as shown below:

Col. 1, line 14, after "a" insert a comma --,--; and line 58, before "steer-" insert --the--.

Col. 2, line 9, delete "sets" insert --set--; and line 63, delete "apparatus" and after "(25)" insert --is--.

Col. 5, line 21, delete "for"; and line 51, delete "make".

Signed and Sealed this

Sixteenth Day of November, 1993

BRUCE LEHMAN

Attest:

Attesting Officer

Commissioner of Patents and Trademarks